United States Patent
Shukla et al.

(10) Patent No.: US 11,917,612 B2
(45) Date of Patent: Feb. 27, 2024

(54) SYSTEMS AND METHODS TO REDUCE NETWORK ACCESS LATENCY AND IMPROVE QUALITY OF SERVICE IN WIRELESS COMMUNICATION

(71) Applicant: EdgeQ, Inc., Santa Clara, CA (US)

(72) Inventors: Hersh Vardhan Shukla, Karnataka (IN); Sriram Rajagopal, Karnataka (IN)

(73) Assignee: EdgeQ, Inc., Santa Clara, CA (US)

( * ) Notice: Subject to any disclaimer, the term of this patent is extended or adjusted under 35 U.S.C. 154(b) by 288 days.

(21) Appl. No.: 17/367,787

(22) Filed: Jul. 6, 2021

(65) Prior Publication Data
US 2023/0010010 A1 Jan. 12, 2023

(51) Int. Cl.
*H04W 72/1268* (2023.01)
*G06N 5/04* (2023.01)
*G06N 20/00* (2019.01)
*H04L 43/028* (2022.01)
*H04W 72/23* (2023.01)
(Continued)

(52) U.S. Cl.
CPC .......... *H04W 72/1268* (2013.01); *G06N 5/04* (2013.01); *G06N 20/00* (2019.01); *H04L 43/028* (2013.01); *H04W 72/23* (2023.01); *H04L 5/0055* (2013.01); *H04W 80/06* (2013.01)

(58) Field of Classification Search
CPC . H04W 72/1268; H04W 72/23; H04W 80/06; H04W 74/04; G06N 5/04; G06N 20/00; H04L 43/028; H04L 5/0055
USPC ....................................................... 455/450
See application file for complete search history.

(56) References Cited

U.S. PATENT DOCUMENTS

| | | |
|---|---|---|
| 2012/0327799 A1 | 12/2012 | Sandlund et al. |
| 2018/0270103 A1* | 9/2018 | Chapman ............ H04L 43/0847 |
| 2019/0223098 A1 | 7/2019 | Ah Sue et al. |

(Continued)

FOREIGN PATENT DOCUMENTS

| | | | |
|---|---|---|---|
| EP | 2557882 A1 | 8/2011 | |
| WO | WO-2021255107 A1 * | 12/2021 | |

OTHER PUBLICATIONS

International Search Report and Written Opinion of the International Searching Authority dated Sep. 7, 2022 in related PCT application No. PCT/US22/29071, (9 pgs).

*Primary Examiner* — Hirdepal Singh
(74) *Attorney, Agent, or Firm* — North Weber & Baugh LLP; Michael North

(57) ABSTRACT

In a grant based system, a user equipment (UE) sends data in an uplink in a request-grant process. The UE first sending a scheduling request, a gNodeB processing the request and scheduling a grant sometime in future, then UE then either sending data if the grant is sufficient or requesting for another grant with more capacity to accommodate data sending. Such a proceeding could cause serious latency in network access. Described in the present patent disclosure are embodiments to reduce the access time by giving pro-active grants through inspecting downlink (DL) data sent to the UE or uplink data being transmitted from the UE. The uplink data may be predictive since it maybe in lieu of requirement for sending a TCP acknowledgement for the DL TCP data scheduled earlier. For voice calls, a ML system for system may be deployed to predict when proactive UL grants may be given.

18 Claims, 4 Drawing Sheets

(51) Int. Cl.
    *H04L 5/00*           (2006.01)
    *H04W 80/06*       (2009.01)

(56) References Cited

U.S. PATENT DOCUMENTS

| | | | |
|---|---|---|---|
| 2019/0349981 A1* | 11/2019 | Sandberg | H04W 28/0289 |
| 2020/0077425 A1* | 3/2020 | Silverman | H04W 72/1273 |
| 2020/0403845 A1 | 12/2020 | Chapman et al. | |
| 2021/0068197 A1 | 3/2021 | Kim et al. | |
| 2022/0060853 A1* | 2/2022 | Gummadi | H04W 64/00 |
| 2022/0210819 A1* | 6/2022 | Sevindik | H04W 72/535 |

* cited by examiner

SYSTEMS AND METHODS TO REDUCE NETWORK ACCESS LATENCY AND IMPROVE QUALITY OF SERVICE IN WIRELESS COMMUNICATION

TECHNICAL FIELD

The present disclosure relates generally to wireless communication. More particularly, the present disclosure relates to systems and methods to reduce network access latency and improve quality of service in wireless communication.

BACKGROUND

In a wireless system, access to RF medium is either contention based in a distributed deployment, e.g., WLAN or initial access in an LTE/NR system, or grant based in centrally coordinated systems, e.g., access point (Wi-Fi) or eNodeB (4G LTE) or gNodeB (5G) controlling access to medium.

In a grant based system, a user equipment (UE) sends data in an uplink (UL) in a request-grant process, e.g., the UE first sending a scheduling request, a gNodeB processing the request and scheduling a grant sometime in future, then UE then either sending data if the grant is sufficient or requesting for another grant with more capacity to accommodate data sending. Such a back-and-forth proceeding could cause serious latency in network access and negatively impact user experience.

Accordingly, what is needed are systems, devices and methods that address the above-described issues.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
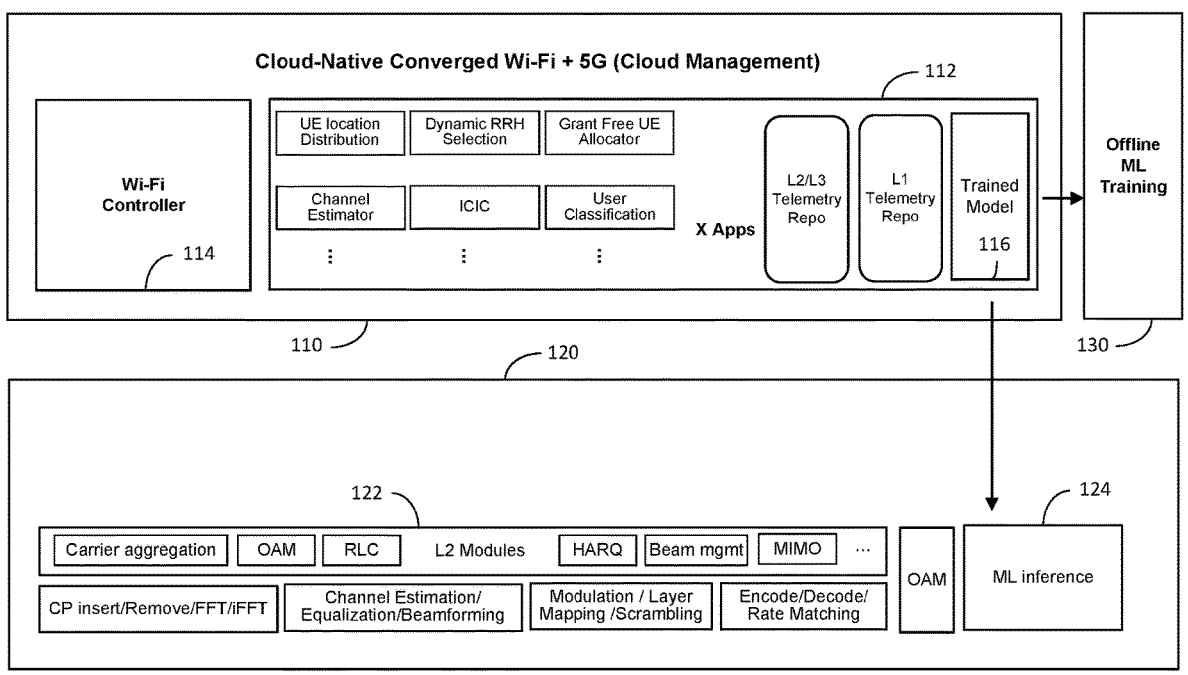
FIG. 1 ("FIG. 1") depicts a block diagram of a machine learning (ML) engine to feed UL predictions to the layer 2 scheduler, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

In a grant based system, a user equipment (UE) sends data in an uplink in a request-grant process, e.g., the UE first sending a scheduling request, a gNodeB processing the request and scheduling a grant sometime in future, then UE then either sending data if the grant is sufficient or requesting for another grant with more capacity to accommodate data sending. Such a back-and-forth proceeding could cause serious latency in network access and negatively impact user experience.

In view of network access latency associated with the request-grant process, various attempts have been explored to give proactive grants. Brute Force Methods give proactive grants blindly for all UL opportunities. Such an approach results in wastage of precious radio resources as well as UE wasting time in sending padding since it may get a grant even though it has no UL data to send. For traffic such as deep learning based transmission control protocol (TCP) (DL-TCP), machine learning (ML) based models may be used. However, such models sit above a modem stack which is too far from a scheduler to trigger a proactive UL grant in time. Furthermore, a feedback to the system that the UL grant was ineffective may be slow and thus cause excessive latency.

Described in the present patent disclosure are system and method embodiments to reduce the access time taken by UE for sending UL data by giving proactive grants through inspecting downlink (DL) data being sent to the UE or uplink data being transmitted from the UE. The UL data may be predictive since it maybe in lieu of requirement for sending a TCP acknowledgement (ACK) for the DL TCP data which was scheduled earlier. Similarly for voice calls, there may be a ML system for predicting when the other person may start speaking and proactive UL grants may be given accordingly. In one or more embodiments, on chip ML engine may be used to feed a prediction to a layer 2 scheduler for proactive grants to reduce latencies and improve user experience in terms of voice quality and faster throughputs.

FIG. 1 depicts a block diagram of an ML engine to feed UL predictions to the layer 2 scheduler, according to embodiments of the present disclosure. A wireless communication station 120 couples to a management server 110, which may be a cloud-native converged management server for both 5G and Wi-Fi communication management. The management server 110 may comprise or be loaded with a Wi-Fi controller 114, a plurality of applications (apps) 112 for implementing various tasks, and a ML model 116 for UL prediction. The ML model 116 may be trained offline via an offline training process 130 using UL predictions and actual UL usages for performance improvements. The plurality of applications 112 may be used for tracking UE location distribution, dynamic remote radio head (RRH) selection, channel estimation and equalization, inter-cell interference coordination (ICIC), user classification, etc. The management server 110 may also comprise one or more telemetry repositories for various layers (e.g., Layer 1 and Layer 2/3) to store operational parameters or data for coupled wireless communication station(s).

The wireless communication station 120 comprises one or more modules 122 for various layer 2 tasks or protocols, e.g., carrier aggregation, OAM (Operations, Administration, and Maintenance), Radio link control (RLC), hybrid automatic repeat request (HARD), beam management, MIMO (multiple-input and multiple-output), etc. The wireless communication station 120 may further comprise a ML inference module 124 for UL prediction inference. The ML inference module 124 may be integrated with a layer 2 scheduler, or alternately, in the PHY layer performing predictive UL scheduling inference in later slots. In one or more embodiments, when the ML model 116 is updated during offline training, the ML model 116 may send updated information, e.g., updated inference parameters, to the ML inference module 124 for inference process updating. The ML inference module 124 may be a ML based artificial neural network having various network structures, e.g., recurrent neural network, convolutional neural network, etc.

Figure 2:
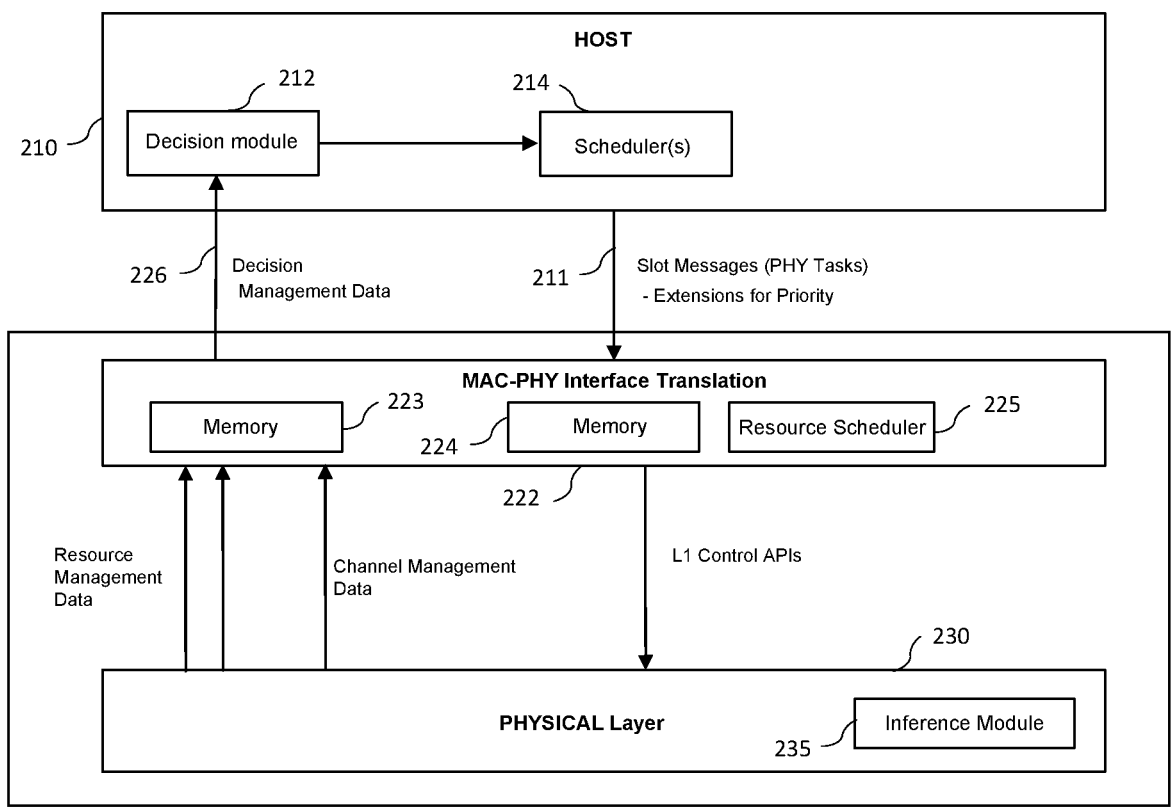
FIG. 2 depicts a schematic diagram for PHY policy implementation with proactive uplink grant inference, according to embodiments of the present disclosure.

FIG. 2 depicts a schematic diagram for PHY policy implementation with proactive uplink grant inference, according to embodiments of the present disclosure. As shown in FIG. 2, the central control unit 210 is a single large-core host comprising multiple configurable processing units 214, which may be single cores configurable for implementing various scheduling tasks. The central control unit 210 may also comprise a decision module 212 coupled to control the multiple configurable processing units for desired scheduling tasks, which may include UL scheduling. The decision module 212 may be a core specifically designated for task scheduling among other cores within the central control unit 210. The decision module 212 receives decision management data 226 resulting from a MAC-PHY interface translation operation 222, which may at least involve codes or firmware loaded within a memory 223 allocated for computation management, API data structure information within a memory 224 allocated for API data structure storage, and a resource scheduling control signal output from a resource scheduler 225. The slot message 211 to be processed in the MAC-PHY interface translation operation may comprise slot/PHY tasks messages related to multiple scheduling inputs and may also comprise extensions for priority among the PHY tasks. In one or more embodiments, the memory 223 allocated for computation management is loaded with management information of the physical layer 230, such that situation of the physical layer 230 may be taken into consideration during the MAC-PHY interface translation operation 222. The management information may comprise resource management data, and channel management data, etc.

An ML inference module 235 is deployed within in the physical layer to perform predictive UL scheduling inference. In one or more embodiments, the ML inference module 235 keeps spoofing the DL data and maintains UE specific information. In one or more embodiments, if the ML inference module 235 learns that for a given UE, the DL data is a certain type, e.g., a TCP or voice data, the ML inference module 235 recommends one or more proactive grants with a predicted moment and predicted parameters (e.g., an interval and a bandwidth) for each proactive grant. A layer 2 scheduler receives the recommendation from the ML inference module 235 and schedules one or more UL grants with the consideration of those recommendations. The one or more UL grants scheduled by the layer 2 scheduler may or may not be the same as the recommended proactive grants. The layer-2 scheduler may make scheduling arrangements based on the recommendations and prevailing channel conditions of the UE, and other parameters such as priority of the UL, available bandwidth for the UL, one or more quality of service (QoS) parameters for a channel reserved for UL, etc.

Figure 3:
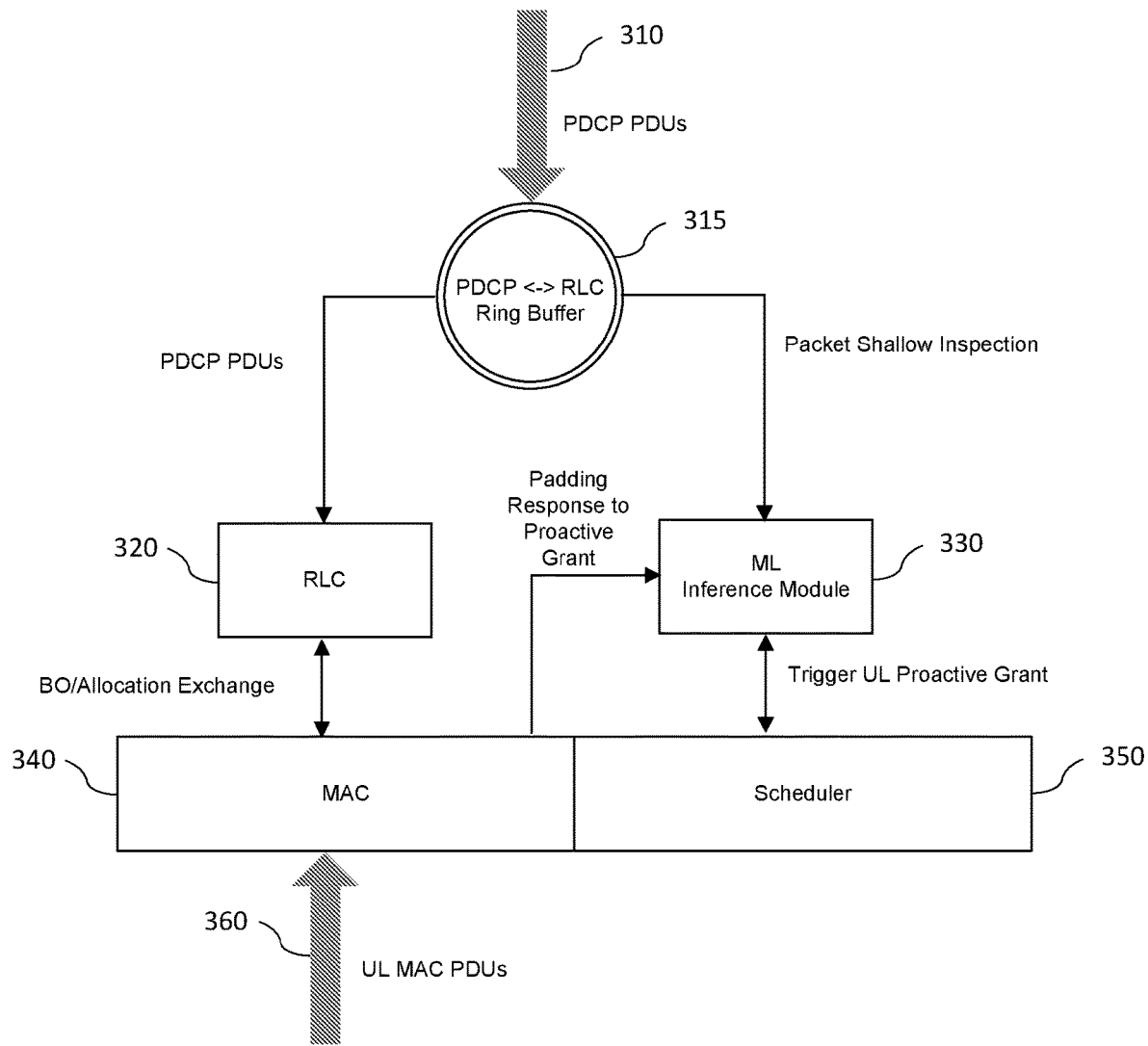
FIG. 3 depicts a block diagram for proactive grant triggering and tracking, according to embodiments of the present disclosure.
Figure 4:
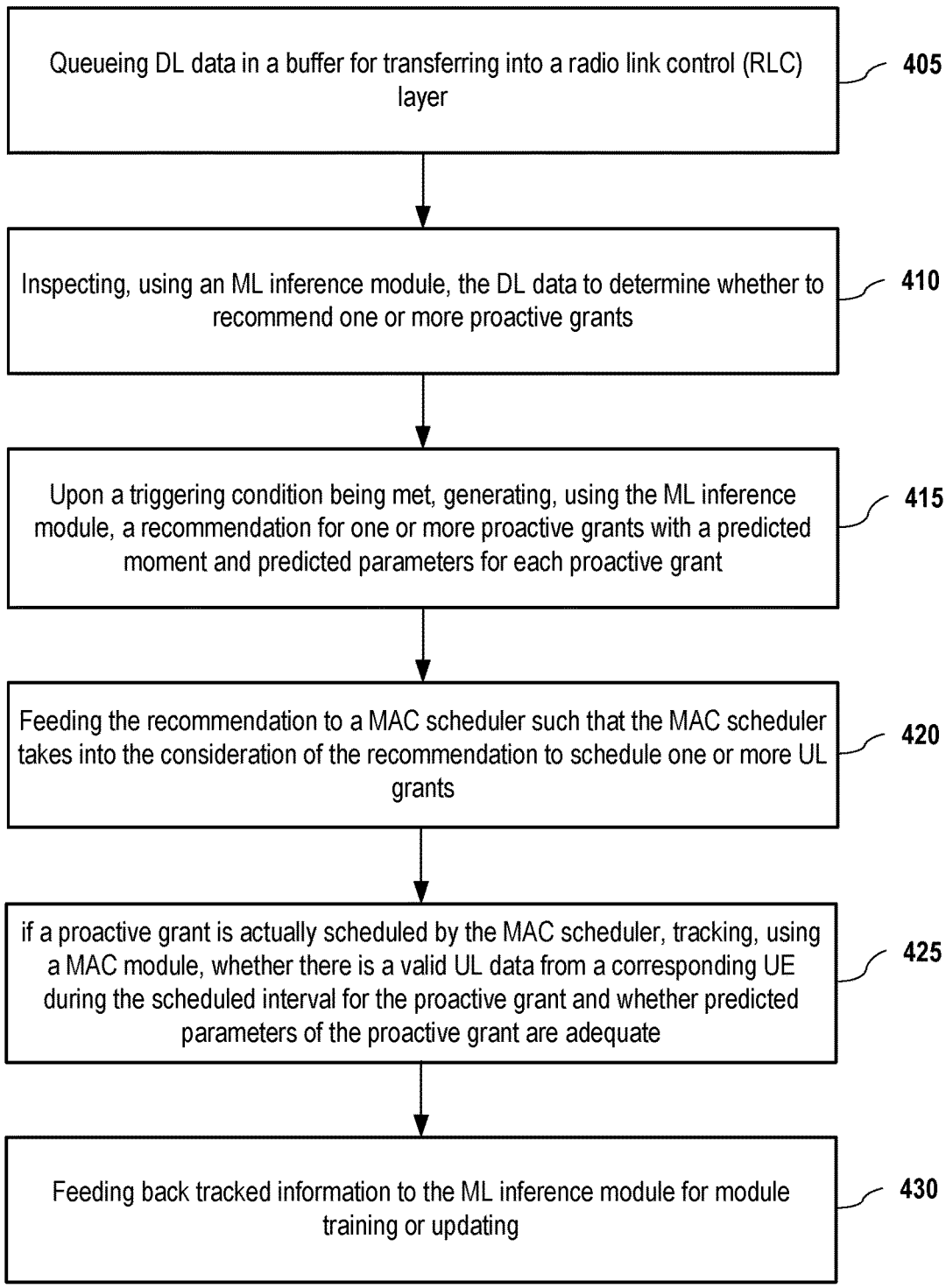
FIG. 4 depicts a method for giving proactive uplink grants using ML based inference, according to embodiments of the present disclosure.

FIG. 3 depicts a block diagram for proactive grant triggering and tracking, according to embodiments of the present disclosure. FIG. 4 depicts a method for giving proactive uplink grants using machine learning (ML) based inference in view of the block diagram shown in FIG. 3. In step 405, DL data to be transmitted to a UE, e.g., a plurality of protocol data units (PDUs) 310 from a Packet Data Convergence Protocol (PDCP) layer, are queued in a buffer 315 (e.g., a ring buffer) for transferring into a radio link control (RLC) layer 320. In step 410, an ML inference module 330 inspects the DL data to determine whether to recommend one or more proactive grants. In one or more embodiments, the inspection is a packet shallow inspection (SPI) for packet headers for optimization of packet routing, detection of network abuse, or statistical analysis, without involving contents of data packets, for user privacy considerations.

In step 415, upon a triggering condition being met, the ML inference module 330 generates a recommendation for one or more proactive grants with a predicted moment and predicted parameters (e.g., an interval and a bandwidth) for each proactive grant. The triggering condition may be a type for the DL data, e.g., a TCP or voice data, etc. In one or more embodiments, the predicted moment and predicted parameters for each proactive grant may be determined based at least on checking requirement in the DL TCP data for sending a TCP ACK from a UE. In one or more embodiments, the recommendation for one or more proactive grants may be determined based on at least on one or more parameters including: QoS/QoS Class Identifiers (QCI) of the user being allocated (packet sizes and ACK/NACK required and sizes of such responses packets), current packet size and buffer status in DL for the user, history of allocation (e.g., slot numbers, size of allocations, etc.) to the user, history of scheduling request (SR) from the user, load condition in UL, load condition in UL, PHY statics in current slot, etc.

In step 420, the recommendation is fed to the layer-2 scheduler 350 (a medium access control (MAC) scheduler) such that the MAC scheduler 350 may take into the consideration of the recommendation to schedule one or more UL grants. Depending on prevailing channel conditions of the UE and/or other parameters, the actually scheduled one or more UL grants may or may not be the same as the recommended proactive grants.

In step 425, if a proactive grant is actually scheduled by the MAC scheduler 350, a MAC module 340 may track whether there is a valid UL data from a corresponding UE during the scheduled interval for the proactive grant and whether predicted parameters of the proactive grant are adequate. For example, the MAC module 340 may track whether proactive scheduled UL packets were null Padded or not transmitted. In step 430, tracked information is fed back to the ML inference module as a feedback, which may be utilized for module training or updating.

One skilled in the art shall understand that the ML inference module 330 may be integrated in a distributed MAC scheduler, and/or be part of PHY acceleration.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for uplink scheduling in wireless communication comprising:
   queueing downlink (DL) data for a user equipment (UE) in a buffer;
   inspecting, using a machine learning (ML) inference module, the DL data to determine whether to recommend one or more proactive grants;
   upon a triggering condition being met, generating, using the ML inference module, a recommendation for the one or more proactive grants with a predicted moment and one or more predicted parameters for each proactive grant;

wherein the one or more predicted parameters comprise an interval and a bandwidth for each proactive grant; and feeding the recommendation to a medium access control (MAC) scheduler such that the MAC scheduler takes into the consideration of the recommendation to schedule one or more uplink (UL) grants.

2. The method of claim 1 further comprising:

responsive to a proactive grant, among the one or more proactive grants, being actually scheduled by the MAC scheduler, tracking, using a MAC module, whether there is a valid UL data from the UE during the scheduled interval for the proactive grant; and feeding back tracked information to the ML inference module for inference training.

3. The method of claim 1 wherein the triggering condition is that the DL data is transmission control protocol (TCP) data or voice data.

4. The method of claim 3 wherein the predicted moment and the one or more predicted parameters for each proactive grant are determined based at least on checking requirement in the TCP data for sending a TCP acknowledgement (ACK) from the UE.

5. The method of claim 1 wherein the ML inference module is integrated together with the MAC scheduler, or is part of physical layer acceleration.

6. The method of claim 1 wherein inference parameters of the ML inference module are trained in an offline training process using UL predictions and actual UL usages.

7. The method of claim 1 wherein the DL data is inspected using a packet shallow inspection (SPI).

8. A wireless communication station comprising:

a buffer to queue downlink (DL) data in protocol data units (PDUs) for a user equipment (UE) coupled to the wireless communication station;

a machine learning (ML) inference module inspecting the DL data to determine whether to recommend one or more proactive grants, upon a triggering condition being met, the ML inference module generates a recommendation for the one or more proactive grants with a predicted moment and one or more predicted parameters for each proactive grant;

wherein the one or more predicted parameters comprise an interval and a bandwidth for each proactive grant; and a medium access control (MAC) scheduler receiving the recommendation to schedule one or more uplink (UL) grants with consideration of the recommendation.

9. The wireless communication station of claim 8 further comprising:

a MAC module coupled to the MAC scheduler, responsive to a proactive grant, among the one or more proactive grants, being actually scheduled by the MAC scheduler, the MAC module tracks whether there is a valid UL data from the UE during the scheduled interval for the proactive grant, and feeds back tracked information to the ML inference module for inference training.

10. The wireless communication station of claim 8 wherein the triggering condition is that the DL data is transmission control protocol (TCP) data or voice data.

11. The wireless communication station claim 10 wherein the predicted moment and the one or more predicted parameters for each proactive grant are determined based at least on checking requirement in the TCP data for sending a TCP acknowledgement (ACK) from the UE.

12. The wireless communication station of claim 8 wherein the ML inference module is integrated together with the MAC scheduler, or is part of physical layer acceleration.

13. The wireless communication station of claim 8 wherein inference parameters of the ML inference module are trained in an offline training process using UL predictions and actual UL usages.

14. The wireless communication station of claim 8 wherein the DL data is inspected using a packet shallow inspection (SPI).

15. A non-transitory computer-readable medium or media comprising one or more sequences of instructions which, when executed by at least one processor, causes steps performed for uplink scheduling comprising:

queueing downlink (DL) data for a user equipment (UE) in a buffer;

inspecting, using a machine learning (ML) inference module, the DL data to determine whether to recommend one or more proactive grants;

upon a triggering condition being met, generating, using the ML inference module, a recommendation for the one or more proactive grants with a predicted moment and one or more predicted parameters for each proactive grant;

wherein the one or more predicted parameters comprise an interval and a bandwidth for each proactive grant; and feeding the recommendation to a medium access control (MAC) scheduler such that the MAC scheduler takes into the consideration of the recommendation to schedule one or more uplink (UL) grants.

16. The non-transitory computer-readable medium or media of claim 15 further comprising one or more sequences of instructions which, when executed by at least one processor, causes steps to be performed comprising:

responsive to a proactive grant, among the one or more proactive grants, being actually scheduled by the MAC scheduler, tracking, using a MAC module, whether there is a valid UL data from the UE during the scheduled interval for the proactive grant; and feeding back tracked information to the ML inference module for inference training.

17. The non-transitory computer-readable medium or media of claim 15 wherein the triggering condition is that the DL data is transmission control protocol (TCP) data or voice data.

18. The non-transitory computer-readable medium or media of claim 15 wherein the DL data is inspected using a packet shallow inspection (SPI).

* * * * *